(12) United States Patent
Baldwin (10) Patent No.: US 11,568,733 B2
(45) Date of Patent: Jan. 31, 2023

(54) MULTIPURPOSE SENSOR SYSTEM FOR DETECTING CHILDREN AND PETS IN A LOCKED VEHICLE AND ALERTING A CAREGIVER AND EMERGENCY SERVICES

(71) Applicant: Juanita Baldwin, Ellerbe, NC (US)

(72) Inventor: Juanita Baldwin, Ellerbe, NC (US)

( * ) Notice: Subject to any disclaimer, the term of this patent is extended or adjusted under 35 U.S.C. 154(b) by 0 days.

(21) Appl. No.: 17/408,912

(22) Filed: Aug. 23, 2021

(65) Prior Publication Data
US 2022/0068114 A1    Mar. 3, 2022

Related U.S. Application Data

(60) Provisional application No. 63/070,299, filed on Aug. 26, 2020.

(51) Int. Cl.
| | | |
|---|---|---|
| *G08B 21/24* | (2006.01) | |
| *G08B 21/22* | (2006.01) | |
| *G08B 21/02* | (2006.01) | |
| *B60Q 1/52* | (2006.01) | |
| *H04W 4/90* | (2018.01) | |
| *H04W 4/40* | (2018.01) | |
| *H04W 4/80* | (2018.01) | |
| *B60H 1/00* | (2006.01) | |

(52) U.S. Cl.
CPC ......... *G08B 21/24* (2013.01); *B60H 1/00742* (2013.01); *B60Q 1/52* (2013.01); *G08B 21/02* (2013.01); *G08B 21/22* (2013.01); *H04W 4/40* (2018.02); *H04W 4/80* (2018.02); *H04W 4/90* (2018.02)

(58) Field of Classification Search
CPC combination set(s) only.
See application file for complete search history.

(56) References Cited

U.S. PATENT DOCUMENTS

| | | | | |
|---|---|---|---|---|
| 10,737,616 | B1* | 8/2020 | Kreager | B60N 2/28 |
| 2002/0161501 | A1* | 10/2002 | Dulin | B60H 1/00742 |
| | | | | 701/45 |
| 2013/0144470 | A1* | 6/2013 | Ricci | G06Q 40/08 |
| | | | | 701/2 |
| 2019/0088103 | A1* | 3/2019 | Lebron | G08B 21/24 |
| 2019/0088104 | A1* | 3/2019 | Crewe | B60R 21/01542 |

* cited by examiner

*Primary Examiner* — Thomas S McCormack
(74) *Attorney, Agent, or Firm* — Brennan, Manna & Diamond, LLC (57) ABSTRACT

The present invention relates to a multipurpose sensor system for vehicles to detect unattended children and/or pets in a locked vehicle. The multipurpose sensor system includes a sensor unit having a plurality of sensors disposed inside the vehicle, and solar panels disposed on an exterior surface of the vehicle. The sensors detect the vehicle's interior temperature and a child's and/or pet's body temperature. More specifically, when the temperature inside the vehicle is equal to or greater than a threshold value, an alarm/alert is generated by the sensor system. The alert is transmitted to an electronic device of a driver, parent or caretaker. Further, an alert is also transmitted to an emergency service for rescuing the child and/or pet.

1 Claim, 6 Drawing Sheets

MULTIPURPOSE SENSOR SYSTEM FOR DETECTING CHILDREN AND PETS IN A LOCKED VEHICLE AND ALERTING A CAREGIVER AND EMERGENCY SERVICES

CROSS-REFERENCE TO RELATED APPLICATION

The present application claims priority to, and the benefit of, U.S. Provisional Application No. 63/070,299, which was filed on Aug. 26, 2020 and is incorporated herein by reference in its entirety.

FIELD OF THE INVENTION

The present invention relates generally to the field of child and pet vehicle safety. More specifically, the present invention relates to a multipurpose sensor system for vehicles that senses the body heat of a child and/or a pet inside the vehicle and also monitors temperature inside the vehicle for generating alerts in case the temperature is too hot or too cold. Accordingly, this disclosure makes specific reference thereto the present invention. Nonetheless, it is to be appreciated that aspects of the present invention are also equally applicable to other like applications, devices and methods of manufacture.

BACKGROUND OF THE INVENTION

By way of background, many vehicles include a front seat belt-monitoring system that outputs a warning or alert signal if the driver-side seatbelt and/or the front passenger-side seatbelt is unbuckled. Further, a rear seatbelt monitoring system outputs a warning if one of the rear seatbelts is unbuckled. These sensors typically include a presence detection component that determines whether a person is sitting in the seat before checking a seat belt status.

In many jurisdictions within the United States of America, infants and children of a certain age and weight are required to be strapped into a child's car seat or booster seat positioned in the rear seats when the automobile is in motion. Child seat-monitoring systems for these child car seats and booster seats detect whether the child car seat or booster seat is installed in the vehicle according to pre-existing installation guidelines and also monitors a seatbelt buckle status and other conditions of the child car seat or booster seat. However, these existing monitoring systems are used for monitoring the child car seat or booster seat when the ignition of the vehicle is on and when the vehicle is in motion.

When a vehicle owner intentionally or unintentionally leaves a child in a locked vehicle for an extended period of time, the unattended child can be seriously injured due to the rising temperature inside the vehicle. Similarly, pets are usually taken along by pet owners while travelling to places. However, pet owners may often leave their pets inside the vehicle knowingly or unknowingly for extended periods of time. Pets left unattended in the vehicle can experience discomfort and/or injury.

Thus, if pets and/or children remain inside a closed and locked vehicle for an extended period of time, especially during extremely hot or extremely cold weather conditions, the vehicle may get hot or cold enough inside to cause the pets and/or children to be injured.

No matter how careful or responsible a parent, vehicle owner or pet owner may be, accidents can still happen, and a child and/or pet can accidentally be left behind in a vehicle. A child and/or pet could suffer serious injury, or even death, if left unattended in a vehicle for an extended period of time. Without an alert system, children and/or pets may be forgotten in hot cars for a longer duration, which is dangerous for infants, children and/or pets. It is desired to have a system that can warn the parent and/or emergency services to rescue the locked child and/or pet and can also perform immediate in-vehicle remedial actions to help the pet and/or child.

Therefore, there exists a long felt need in the art for a child/pet occupancy warning system that detects the presence of an infant, child or pet left unattended inside a locked vehicle. There is also a long felt need in the art for a child/pet occupancy warning system that monitors if a pet and/or child is left inside the locked vehicle, and alerts the vehicle owner to take action to rescue the unattended pet and/or child. Additionally, there is a long felt need in the art for a child/pet occupancy warning system that ensures that the child and/or pet is not left unattended in a vehicle for an extended period of time. Moreover, there is a long felt need in the art for a child/pet occupancy warning system that can alert emergency services to rescue the child and/or pet. Further, there is a long felt need in the art for a child/pet occupancy warning system that prevents the child and/or pet from suffering from heatstroke, suffocation, serious injuries and even death. Furthermore, there is a long felt need in the art for a child/pet occupancy warning system that can perform in-vehicle remedial actions. Finally, there is a long felt need in the art for a child/pet occupancy warning system that prevents the child and/or pet from being left inside the vehicle for an extended time period, and ensures that the vehicle owner take immediate rescue measures to protect the child and/or pet from being suffocated inside the vehicle.

The subject matter disclosed and claimed herein, in one embodiment thereof, comprises a multipurpose sensor system for detecting a child and/or pet in a vehicle. The multipurpose sensor system comprises a sensor unit that has a plurality of sensors, and a solar panel disposed on an exterior surface of the vehicle for providing power to the sensor unit. The plurality of sensors include a thermal sensor for detecting temperature inside the vehicle and body temperature of a child and/or pet in the vehicle and a location sensor for determining location of the vehicle. The sensor unit is connected to an electric control unit of the vehicle for activating one or more in-vehicle remedial actions, including rolling down windows, activating air conditioning or activating the heating unit of the vehicle. The sensor unit comprises a wireless communication module for transmitting an alert to a companion smartphone application indicating a locked child and/or pet when the temperature detected by the thermal sensor is greater than a predetermined threshold.

In this manner, the novel multipurpose sensor device of the present invention accomplishes all of the forgoing objectives, and provides a relatively safe, easy and convenient solution to determining the presence of a child and/or pet left inside a locked vehicle and ensures that the child and/or pet does not remain unattended in the vehicle for an extended period of time. Additionally, the multipurpose sensor device is powered by solar power, and is configured to send alerts to the vehicle owner or other concerned person when a child and/or pet is left inside the vehicle, allowing them to take immediate actions to rescue the child and/or pet and prevent injury.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a multipurpose sensor system for detecting a child and/or pet inside a vehicle. The multipurpose sensor system is configured to be installed inside a vehicle and is used for alerting parents, vehicle owners and/or emergency services that a child, pet or an older person is left in an unattended vehicle for an extended period of time. The multipurpose sensor system comprises a sensor unit having a plurality of sensors, and a solar panel disposed on an exterior surface of the vehicle for providing power to the sensor unit. The sensors include a thermal sensor for detecting temperature inside the vehicle and body temperature of a child and/or pet in the vehicle and a location sensor for determining location of the vehicle. The sensor unit is connected to an electric control unit of the vehicle for activating one or more in-vehicle remedial actions including rolling down windows, activating air conditioning or activating the heating unit of the vehicle. Further, the sensor unit comprises a wireless communication module for transmitting an alert to a companion smartphone application indicating a locked child and/or pet when the temperature detected by the thermal sensor is greater than a predetermined threshold.

The multipurpose sensor system is further configured to alert an emergency service in case a parent and/or a vehicle owner does not rescue the locked child and/or pet within a predefined time period, such as five minutes.

In yet another embodiment of the present invention, the multipurpose sensor system works even when the ignition of the vehicle is off. The sensor unit uses solar panels for powering the sensors and transmitting the alerts.

In yet a further embodiment, a method for transmitting a locked child and/or pet alert in a vehicle is described. The method includes installing a multipurpose sensor system on a dashboard of a vehicle, monitoring temperature inside the vehicle using a thermal sensor of a sensor unit, monitoring body temperature of a child and/or a pet locked inside the vehicle, activating in-vehicle remedial actions and transmitting an alert when said temperature and said body temperature are equal to or greater than respective preset temperature values, and wherein the alert is transmitted to a remote electronic device having an installed software application paired with the multipurpose sensor system. The method further includes transmitting an alert to an emergency service in case a parent or an owner does not rescue the child or pet within a predetermined time limit.

In yet another embodiment of the present invention, a child or pet occupancy alert system installed in a vehicle is disclosed. The system includes a sensor unit having a processor and a plurality of sensors including a thermal sensor, a plurality of solar panels disposed on an exterior surface of the vehicle for providing power to the sensor unit and wherein the processor is configured to receive sensor values from the plurality of built-in sensors. Further, the sensor unit generates a wireless alert signal when the thermal sensor measures temperature inside the vehicle and body temperature values greater or equal to their corresponding temperature threshold values.

In yet a further embodiment, the sensor unit of the present invention can be installed on the dashboard, back seat or ceiling of the vehicle. The thermal sensor scans the temperature of the vehicle and the body temperature of an occupant.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long felt need in the art for a child/pet occupancy warning system that detects the presence of any infant, child and/or pet left unattended inside a locked vehicle for an extended period of time. There is also a long felt need in the art for a child/pet occupancy warning system that monitors if any pet and/or child is left inside the locked vehicle, and alerts the vehicle owner to take action to rescue the unattended pet(s) and/or infant(s). Additionally, there is a long felt need in the art for a child/pet occupancy warning system that ensures that the child and/or pet is not left unattended in vehicles for an extended period of time. Moreover, there is a long felt need in the art for a child/pet occupancy warning system that can alert emergency services to rescue the child and/or pet. Further, there is a long felt need in the art for a child/pet occupancy warning system that prevents children and pets from suffering from heatstroke, suffocation, serious injuries and even death, due to being left unattended inside a vehicle for an extended time period. Furthermore, there is a long felt need in the art for a child/pet occupancy warning system that can perform in-vehicle remedial actions. Finally, there is a long felt need in the art for a child/pet occupancy warning system that prevents children and pets from being left inside a vehicle for an extended time period and ensures that vehicle owners take immediate rescue measures to protect children and pets from being suffocated inside the vehicles.

The present invention, in one exemplary embodiment, is a child and/or pet occupancy alert apparatus installed in a vehicle. The apparatus comprises a sensor unit having a processor and a plurality of sensors including a thermal sensor, a plurality of solar panels disposed on an exterior surface of the vehicle for providing power to the sensor unit, and wherein the processor is configured to receive sensor values from the plurality of built-in sensors. Further, the sensor unit generates a wireless alert signal when the thermal sensor measures temperatures inside the vehicle, and body temperature values greater or equal to corresponding temperature threshold values.

Figure 1:
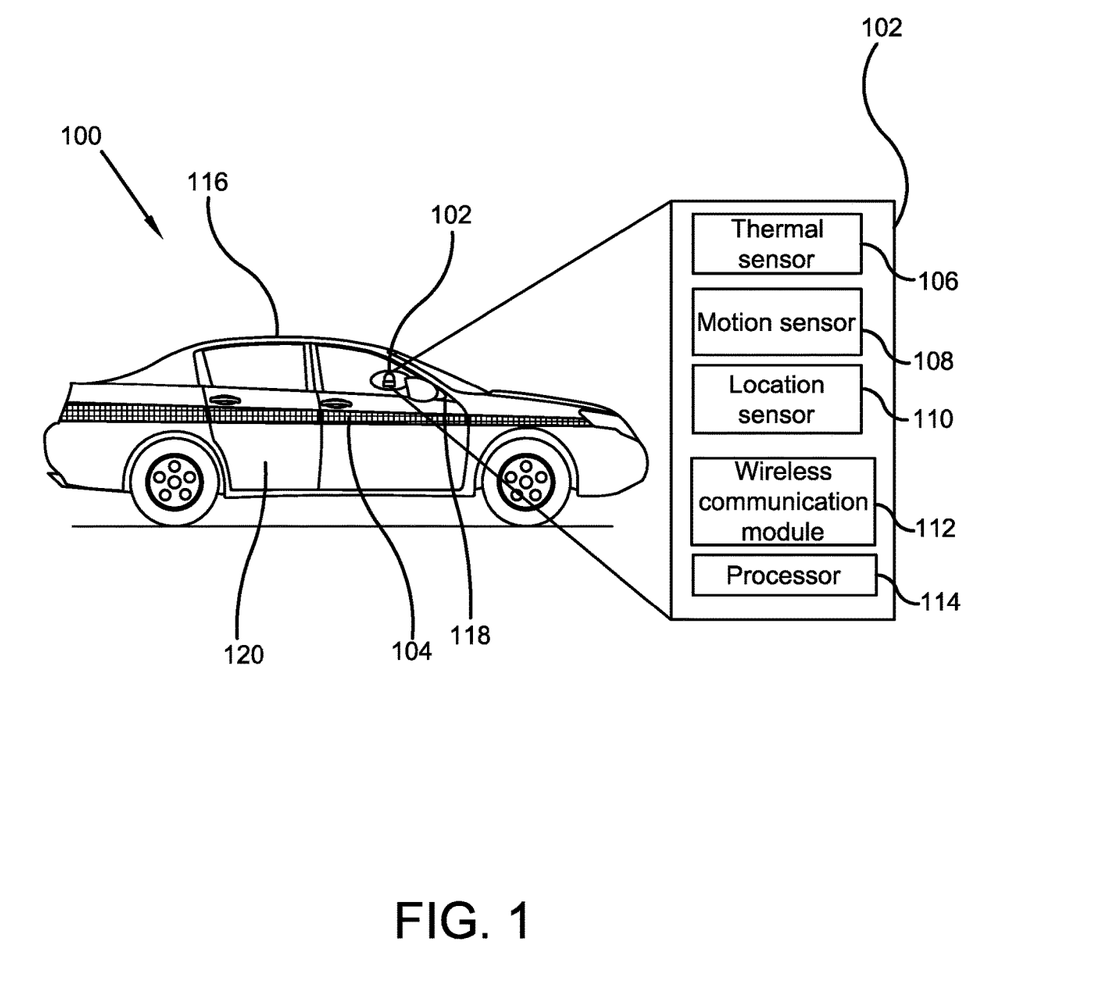
FIG. 1 illustrates a perspective view showing the multipurpose sensor system of the present invention in accordance with the disclosed architecture.

Referring initially to the drawings, FIG. 1 illustrates a perspective view showing the multipurpose sensor system of the present invention. The multipurpose sensor system 100 of the present invention is a child and/or pet safety system designed to alert or notify vehicle owners such as parents, caretakers, guardians, emergency service responders, etc., or any other suitable user as is known in the art, that a child and/or a pet has been left in an overheating vehicle 116. The multipurpose sensor system 100 is designed to safely support and secure a child and/or pet in a passenger vehicle 116 such as a car, van, truck, etc., or any other suitable vehicle as is known in the art. More specifically, the multipurpose sensor system 100 comprises a plurality of sensors embodied in a sensor unit 102 that is positioned within the vehicle 116, preferably on the dashboard 118 of the vehicle 116 or on any other suitable position within the vehicle 116 as is known in the art, such as a seatback, vehicle ceiling, doorframe, etc. Further, a plurality of solar panels 104 are installed on an exterior surface 120 of the vehicle 116. Any number of solar panels 104 can be utilized, depending on the wants and/or needs of a user. Further, the plurality of solar panels 104 can be positioned at any suitable position on the exterior surface 120 of the vehicle 116, depending on the needs and/or wants of a user, as well as the size and shape of the vehicle 116. The sensor unit 102 is powered by the plurality of solar panels 104 installed on the exterior surface 120, such that the sensor unit 102 is active even when the ignition of the vehicle 116 is off, such as when the vehicle 116 is parked. The plurality of solar panels 104 comprise a plurality of solar cells for absorbing solar energy and for providing power to the sensor unit 102.

The sensor unit 102 comprises a plurality of sensors including a thermal sensor 106 that determines the temperature inside the vehicle 116. The thermal sensor 106 also determines the body temperature of a child and/or pet left inside the vehicle 116. The sensor unit 102 includes a motion sensor 108 for detecting the presence of a pet or a child in the vehicle's passenger seats. Alternatively, the sensor unit 102 may not have a motion sensor 108, but may use the motion sensor built-in the vehicle 116. The sensor unit 102 also includes a location sensor 110 for detecting the current location of the vehicle 116. The location sensor 110 is a Global Positioning System (GPS) unit, or any other suitable type of location detection system that computes coordinates (i.e. latitude, longitude, altitude) corresponding to the current location of the vehicle 116 as is known in the art.

Additionally, the sensor unit 102 comprises a wireless communication module 112 which allows the multipurpose sensor system 100 to communicate wirelessly with the vehicle owner's mobile device using a wireless connection such as Wi-Fi, or Bluetooth, etc., or any other suitable type of wireless technology as is known in the art. The wireless communication module 112 is also used for transmitting a notification or alert to an emergency service unit in case the parent or other user does not come to rescue the child and/or pet within a predetermined period of time. Further, the sensor unit 102 is also connected to an electronic control unit (ECU) of the vehicle through a processor 114. The ECU of the vehicle receives the signal from the processor 114 and processes the received signal to generate an output to perform specified actions such as activating in-vehicle functions, for example rolling down windows, activating the air conditioning unit, activating the heating unit, etc., or any other suitable type of action that reduces the discomfort of the child, pet or disabled person locked within the vehicle 116.

The processor 114 may include a digital signal processor (DSP). The DSP executes a software program that determines how the processor 114 controls the various sensors of the multipurpose sensor system 100. Alternatively, the processor 114 includes a microcontroller, etc., or other suitable form of digital processor as is known in the art. As another alternative, the processor 114 may optionally be replaced with a state machine or hardwired circuit, etc. Accordingly, the sensors of the sensor unit 102 provide signals to the processor 114 for operating the multipurpose sensor system 100 as described herein.

It should be noted that the signals of all the sensors of the sensor unit 102 are transmitted through the controller area network of the vehicle 116. The controller area network allows the ECU of the vehicle 116 to communicate with the one or more sensors and perform the in-vehicle remedial actions.

In one embodiment of the present invention, the sensor unit 102 can be positioned near the back seat, and may be connected to a child safety car seat through the ECU of the vehicle 116. The sensor unit 102 can also monitor the status of the lock of the child safety car seat to determine if there is a child present in the child safety car seat of the vehicle 116. Further, the sensor unit 102 positioned near the child safety car seat also allows effective measurement of the body temperature of a child sitting on the child safety car seat.

The system 100 of the present invention can also be part of an onboard dashboard or monitoring system of the vehicle 116, wherein temperature settings, alarms and alarm notification features are programmed into the onboard dashboard, factory pre-programmed, dealer installed, etc. For example, an onboard thermometer positioned inside the vehicle 116 can be set to predefined temperatures (manually by a user or pre-programmed) that can also activate alarms, and/or provide remote notifications to portable peripheral cellular phones, as described within the other embodiments.

Figure 2:
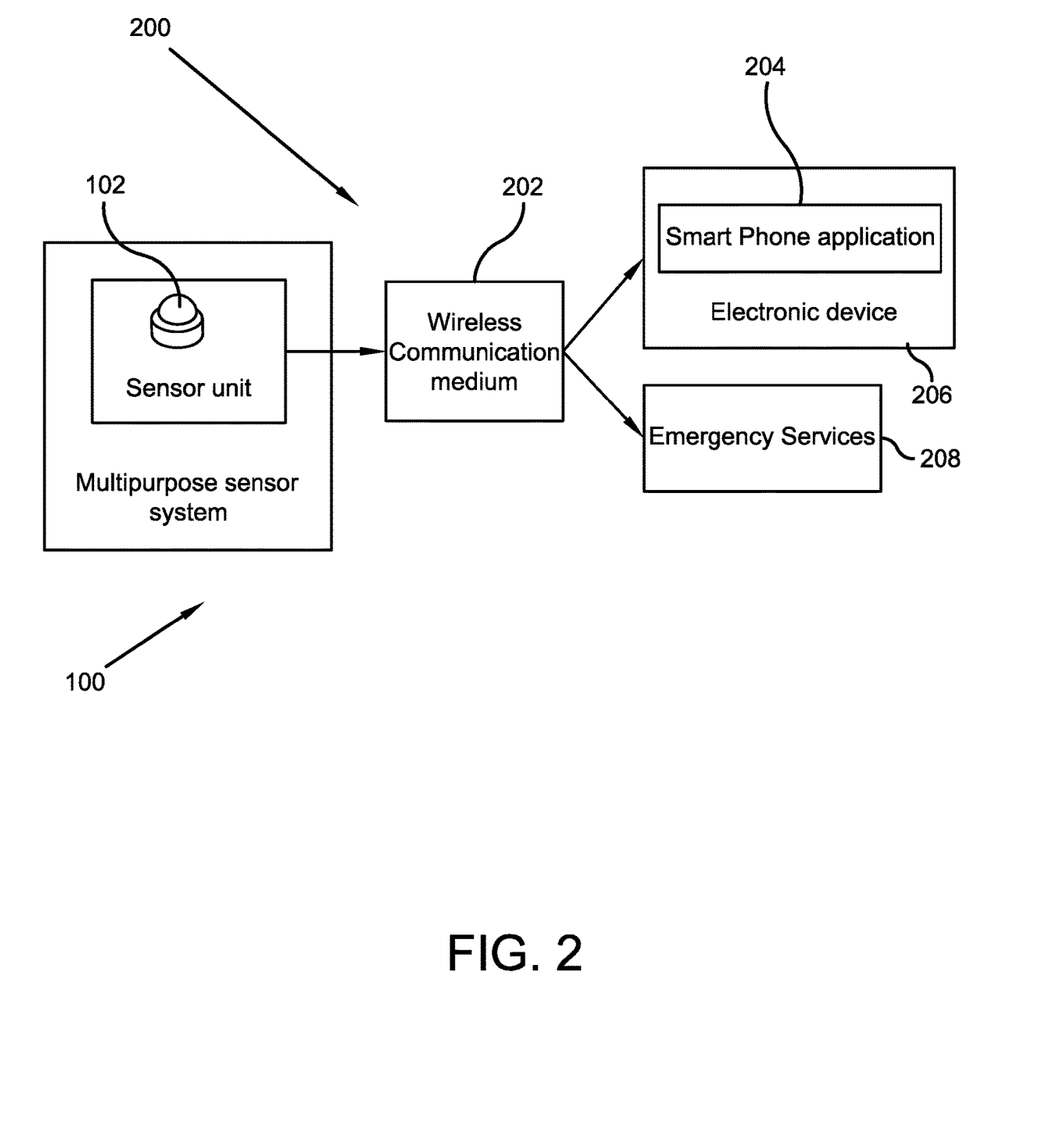
FIG. 2 illustrates a perspective view showing the wireless connection medium of the sensor unit of the multipurpose sensor system for transmitting alerts to a smartphone application and to emergency services in accordance with the disclosed architecture.

FIG. 2 illustrates a perspective view showing the wireless connection medium of the sensor unit of the multipurpose sensor system for transmitting alerts to a smartphone application and to emergency services. In the safety alert generation system 200, the multipurpose sensor system 100 installed in the vehicle as shown in FIG. 1 transmits alerts to vehicle owners such as one or more parents, caretakers, guardians, emergency service responders, etc., or any other suitable user as is known in the art, about a child and/or pet that has been left within an overheating vehicle. The sensor unit 102 of the system 100 connects to at least one paired electronic device 206 such as a smartphone, cellular phone, etc., or any other suitable handheld electronic device which uses a wireless communication medium 202 such as Bluetooth, Wi-Fi, etc., or any other suitable wireless technology as is known in the art. The electronic device 206 comprises an installed companion software application 204 which receives alerts and notifications from the multipurpose sensor system 100 via the wireless communication medium 202. Specifically, one or more sensors of the sensor unit 102 detect the presence of the child and/or pet within a vehicle and detect the body temperature of the child and/or pet left inside the vehicle. The sensor unit 102 automatically sends real-time alerts to all of the paired and configured electronic devices 206 that are authorized to receive notifications from the sensor unit 102. The notification or alert can indicate the presence of a child and/or pet within an overheating vehicle, which then allows the vehicle owner to remove the child and/or pet from the vehicle as quickly as possible. The alert or notification sent to the parent and/or vehicle owner allows them to revisit the vehicle and check on the child and/or pet, thus minimizing the risk associated with traveling with children and pets.

The alert-generating system 100 can also send an alert to an emergency service unit 208 such as a 911 service, EMT service, etc., or any other suitable emergency service as is known in the art. The emergency services 208 are alerted when a vehicle owner or parent does not come back to the vehicle to check on the child and/or pet within a predetermined time period (i.e., such as five minutes, etc.). The emergency services 208 receive the alert in the form of a call, text, or audio alert, etc., or any other suitable form as is known in the art, which includes the location name or GPS coordinates indicating the location of the vehicle.

It should be appreciated that vehicle owners such as parents, care takers, guardians and/or emergency responders receive real-time alerts when a child has been left in the vehicle. The alerts or notifications shown on the software application 204 may be in the form of push notifications or an audio alert, etc., or any other suitable form of notifications as is known in the art. The notification alerts displayed through the smartphone application allow vehicle owners to provide an immediate response to the child and/or pet left within the vehicle.

As stated supra, the notifications provided through the multipurpose sensor system 100 alert the driver, parent, vehicle owner, emergency services and/or any other suitable user as is known in the art to provide an immediate response. The notifications can include an alarm condition that is selected from one or more of the following categories: (i) a graphical warning such as a textual message and/or pictorial icon or (ii) an audible alarm such as a chime, horn sound, buzzer sound, voice command, etc., or any other suitable notification as is known in the art.

Figure 3:
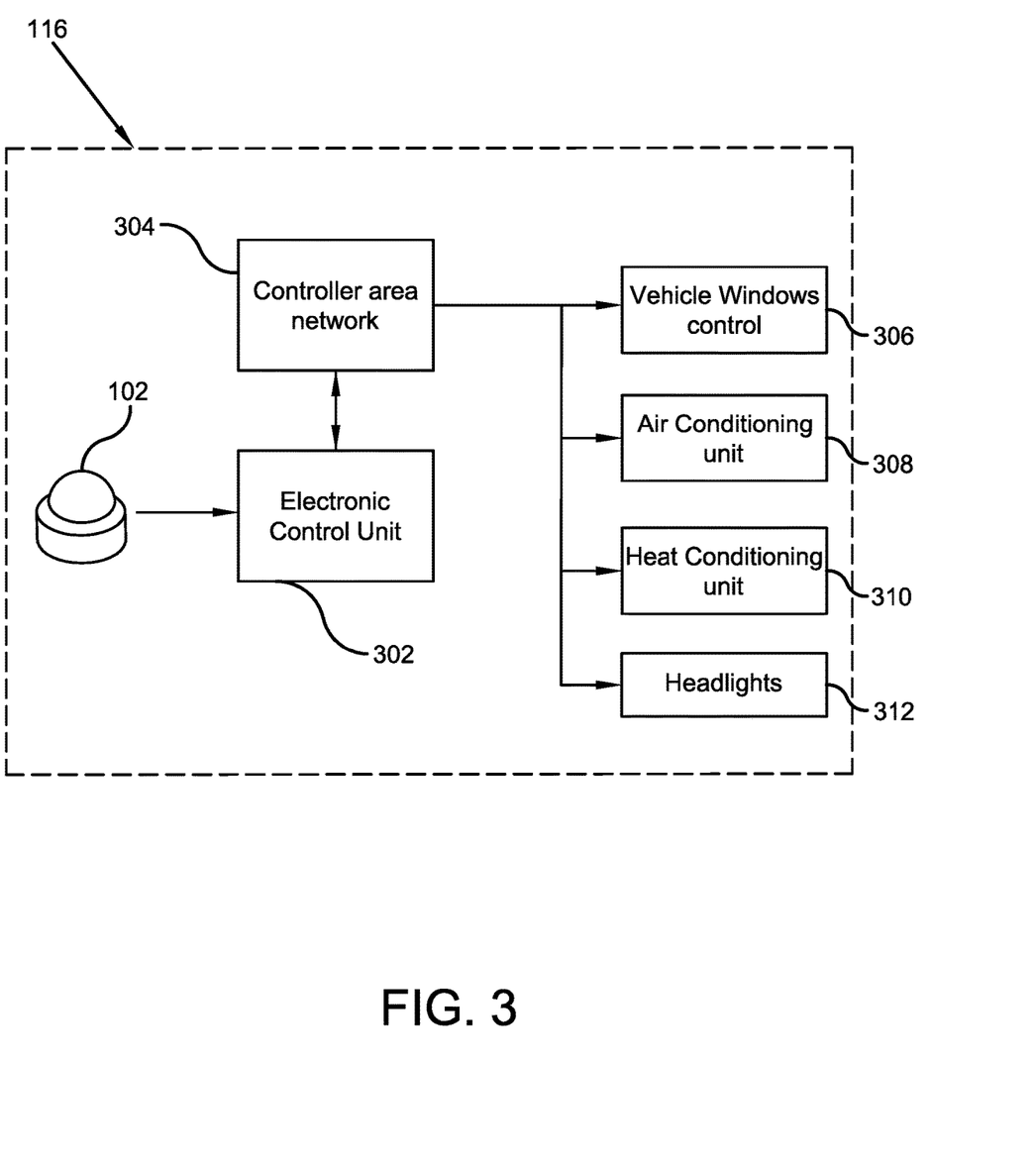
FIG. 3 illustrates a schematic view showing the connection of the sensor unit of the multipurpose sensor system with the electronic control unit of the vehicle allowing the sensor unit to communicate with one or more components of the vehicle in accordance with the disclosed architecture.

FIG. 3 illustrates a schematic view showing the connection of the sensor unit of the multipurpose sensor system with the electronic control unit of the vehicle which allows the sensor unit to communicate with one or more components of the vehicle. The sensor unit 102 positioned inside the vehicle 116 is in communication with the electronic control unit 302 to perform the necessary in-vehicle remedial actions in circumstances where a parent or a vehicle owner, or even an emergency service unit, is not responding to the alerts and/or notification sent to a paired electronic device alerting a user that a child and/or a pet is locked within the vehicle 116. Some of the exemplary remedial actions that are performed by the sensor unit 102 include rolling down the vehicle windows, activating the air conditioning unit or activating a heating unit of the vehicle. In operation, the sensor unit 102 senses an inner temperature of the vehicle 116 and/or the body temperature of the child and/or pet locked within the vehicle 116, and sends a remedial signal to the electronic control unit 302 if the user is non-responsive to alerts. The electronic control unit 302 through the controller area network (CAN) 304 of the vehicle 116, performs the in-vehicle remedial actions. The controller area network 304 is a vehicle bus standard, designed to allow the electronic control unit 302 to communicate with the thermal sensor 102 and perform the in-vehicle remedial actions. For example, once activated the electronic control unit 302 actuates the vehicle windows control 306 to roll down the vehicle's windows, thereby allowing the child and/or pet locked within the vehicle to get fresh air and be rescued easily. Further, an air conditioning unit 308 can be activated, thereby allowing the increasing inner temperature of the vehicle 116 to decrease, and providing some cooler air to the child and/or pet locked within the vehicle 116. During winter months, when the temperature inside the vehicle 116 can drop quickly and become freezing, the heating unit 310 of the vehicle can be actuated to provide warm air to the child and/or pet locked within the vehicle 116.

Furthermore, the controller area network 304 also controls a vehicle's headlights 312. Specifically, for notifying people near the vehicle 116 for immediate help, the headlights 312 of the vehicle 116 can be activated by the sensor unit 102 in order to convey a growing sense of urgency as time passes, and/or to ensure that a vehicle operator or other user(s) near the vehicle 116 is effectively notified of the urgent condition in a timely manner.

All of the vehicle remedial actions can be enabled simultaneously, in a sequential manner or independently, as desired by a user. As previously stated, these remedial actions may be communicated by various components provided, preferably by the vehicle manufacturer or any other suitable provider as is known in the art.

Figure 4:
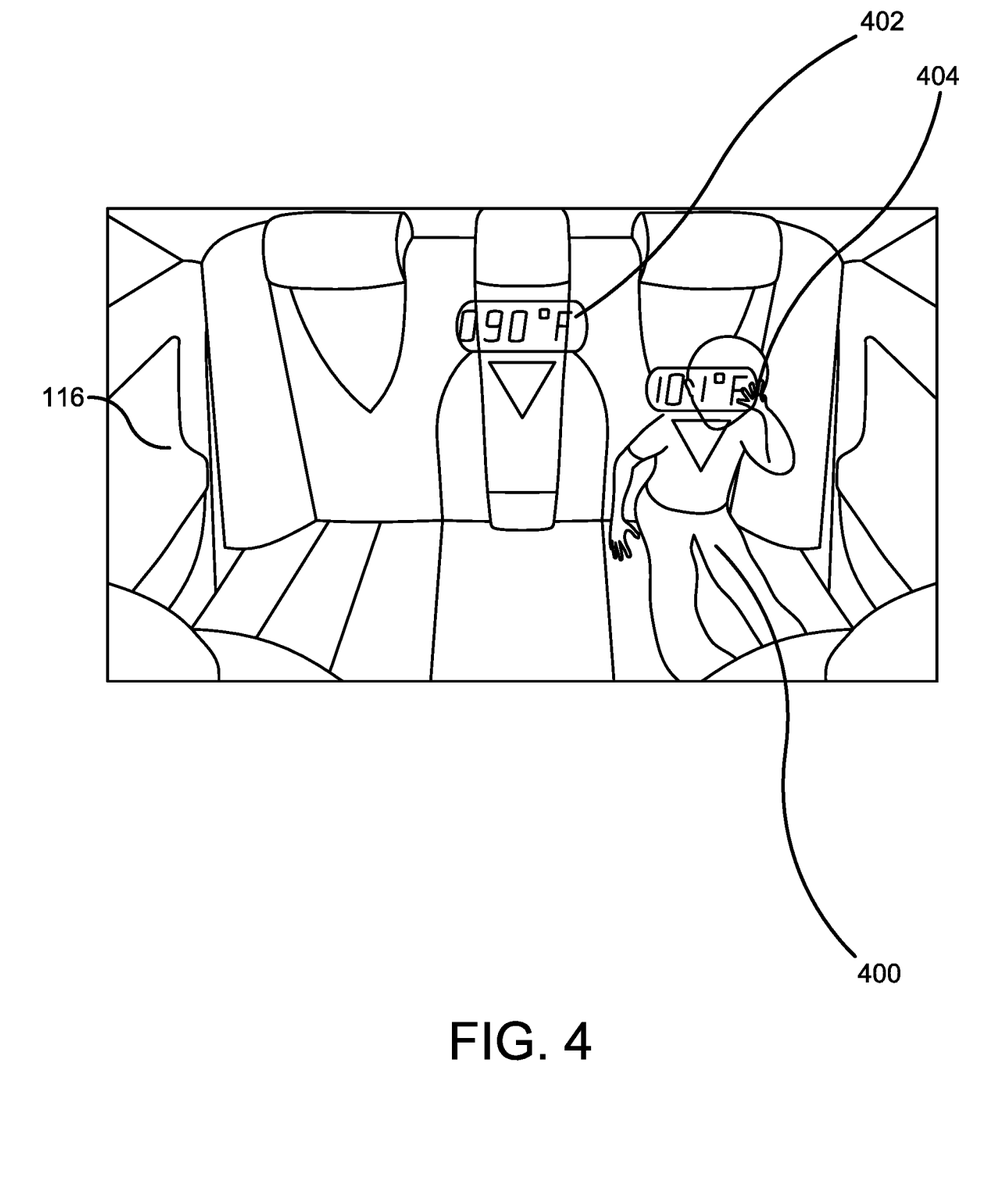
FIG. 4 illustrates a perspective view of the functioning of the thermal sensor of the sensor unit in accordance with the disclosed architecture.

FIG. 4 illustrates a perspective view of the functioning of the thermal sensor of the sensor unit. As shown in FIG. 4, the thermal sensor of the sensor unit determines the temperature inside the vehicle 116. Specifically, the thermal sensor detects the temperature inside the vehicle 116 and the body temperature of the child and/or pet locked within the vehicle 116. For example, the internal temperature 402 detected inside the vehicle 116 is 90° F. Once the sensor unit determines that the temperature 402 inside the vehicle 116 exceeds a preset critical interior vehicle temperature, then the thermal sensor determines the body temperature 404 of the child 400 within the vehicle 116. For example, in FIG. 4, the body temperature 404 of the child 400 is determined to be 101° F. Then, if it is determined that the body temperature 404 of the child 400 or the pet exceeds the pre-set normal body temperature, an alert is generated and sent, using the wireless communication medium to the vehicle owner's paired mobile phone, which comprises an installed software application.

Furthermore, it should be noted that a first alert can be transmitted as soon as the thermal sensor detects a greater internal temperature inside the vehicle than outside. A second alert, which is more urgent than the first, is then transmitted when the body temperatures of the pet and/or child locked within the vehicle are detected as exceeding a threshold temperature.

Figure 5:
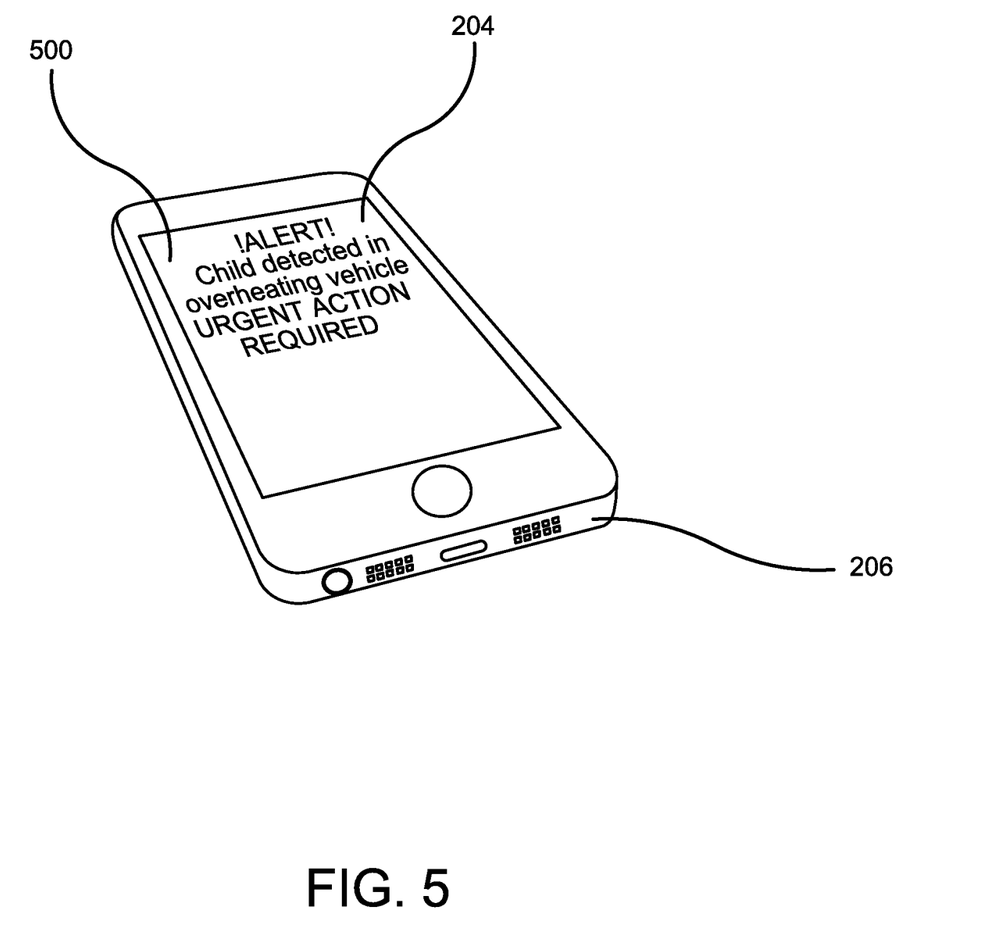
FIG. 5 illustrates an exemplary notification display on a companion software application installed in an electronic device in accordance with the disclosed architecture.

FIG. 5 illustrates an exemplary notification displayed on the companion software application installed on the electronic device. As shown in FIG. 5, the electronic device 206 such as a smartphone, cellular phone, etc., or any other suitable device as is known in the art, has a software application 204 installed that receives an alert 500 from the multipurpose sensor system 100 via a wireless communication channel. The alert 500 can be in the form of a push notification, text message, audio alert, etc., or any other suitable notification as is known in the art, which includes information that an unattended child is detected within an overheating vehicle. The vehicle owner can then immediately respond to the locked child and/or pet upon reviewing the notification or alert 500. A similar alert can also be transmitted to an emergency service unit, which includes information not only in regards to the locked child, but also location coordinates of the vehicle. The emergency service responder on receiving the alert can then respond to the unattended child left within the vehicle.

Figure 6:
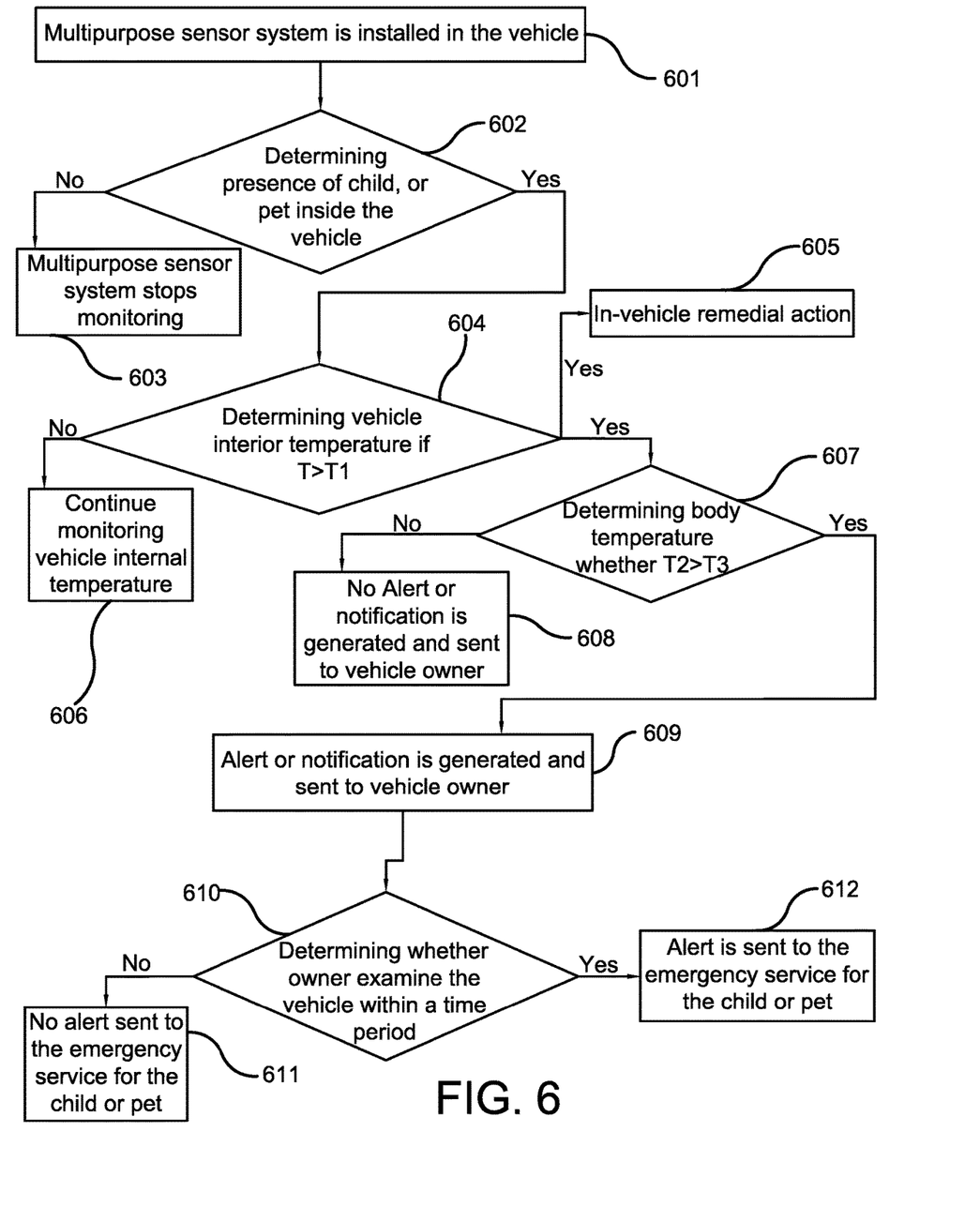
FIG. 6 illustrates an exemplary flow diagram showing the steps for generating alerts by the multipurpose sensor system of the present invention in accordance with the disclosed architecture.

FIG. 6 illustrates an exemplary flow diagram showing the steps for generating alerts by the multipurpose sensor system of the present invention. As shown in FIG. 6, at 601 the multipurpose sensor system is installed inside a vehicle. Then at 602, the multipurpose sensor system determines the presence of a child and/or pet inside the locked vehicle. If, it is determined that a child and/or pet is not present inside the vehicle, then 603 the multipurpose sensor system stops monitoring. Further, if it is determined that a child and/or pet has been left within the locked vehicle, then at 604 the sensor unit determines whether the interior temperature "T" of the vehicle exceeds a preset critical interior vehicle temperature T1 (i.e., T>T1).

If it is determined that temperature T inside the vehicle does not exceed the preset critical interior vehicle temperature T1, then at 606 the multipurpose sensor system continues to monitor the interior vehicle temperature. Further, if it is determined that temperature T inside the vehicle exceeds the preset critical interior vehicle temperature T1 (i.e., T>T1), then at 605 the multipurpose sensor system initiates the in-vehicle remedial actions, such as rolling windows down or activating the air conditioning unit of the vehicle. Then at 607, the system also determines whether the body temperature T2 of the child and/or the pet left inside the vehicle exceeds a preset critical body temperature T3.

Further, if it is determined that the body temperature T2 of the child and/or pet left inside the vehicle does not exceed the preset critical interior body temperature T3, then at 608 no alert is generated. If it is determined that the body temperature T2 of the child and/or pet left inside the vehicle exceeds the preset critical body temperature, then at 609 the multipurpose sensor system generates and sends an alert to a vehicle owner's paired mobile phone.

Once the alerts are generated and forwarded to the paired mobile phone, at 610 the multipurpose sensor system determines for a predetermined time period (i.e., five minutes) if a user such as the vehicle owner has responded to the unattended child and/or pet left within the vehicle. If it is determined that the vehicle owner has responded to the unattended child and/or pet left within the vehicle, then at 611 no alert is sent to the emergency service responder.

Further, if it is determined that the vehicle owner has not examined the vehicle and has not responded to the unattended child and/or pet left within the vehicle, then at 612 an alert is generated and sent to the emergency service responder (i.e., police, firefighters, paramedics, etc.) to respond to the unattended child and/or pet left within the vehicle.

It should be appreciated that based on the implementation and preferences of the user, both the in-vehicle remedial actions and the alerts can be generated once it is determined that the internal temperature of the vehicle is greater than a predetermined temperature threshold. In some embodiments, the multipurpose sensor system 100 can be manually turned on or off by the vehicle operator. For example, the vehicle operator may activate the multipurpose sensor system 100 after starting the engine of the vehicle.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "multipurpose sensor system", "sensor system", "child or pet occupancy alert system", "system", "scanner device", and "alert system" are interchangeable and refer to the multipurpose sensor system 100 of the present invention.

Notwithstanding the forgoing, the multipurpose sensor system 100 of the present invention can be of any suitable size and configuration as is known in the art without affecting the overall concept of the invention, provided that it accomplishes the above-stated objectives. One of ordinary skill in the art will appreciate that the size, configuration, and material of the multipurpose sensor system 100 as shown in FIGS. 1-6 is for illustrative purposes only, and that many other sizes and shapes of the multipurpose sensor system 100 are well within the scope of the present disclosure. Although the dimensions of the multipurpose sensor system 100 are important design parameters for user convenience, the multipurpose sensor system 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of generating an alert by a multipurpose sensor system for a vehicle comprising the steps of:
   installing the multipurpose sensor system inside the vehicle;
   determining a presence of a child or pet inside the vehicle;
   determining whether an interior temperature of the vehicle exceeds a preset critical interior vehicle temperature;
   initiating an in-vehicle remedial action;
   determining whether a body temperature of the child and/or the pet left inside the vehicle exceeds a preset critical body temperature; and
   generating and sending the alert to an owner of the vehicle if the body temperature of the child or pet exceeds the preset critical body temperature, wherein if the owner of the vehicle has not responded to the alert, then sending the alert to an emergency service responder.

* * * * *